United States Patent
Rodriguez-Rivera et al.

(10) Patent No.: US 7,299,384 B1
(45) Date of Patent: Nov. 20, 2007

(54) FIXING PREMATURELY FREED OBJECTS

(75) Inventors: Gustavo Rodriguez-Rivera, West Lafayette, IN (US); Michael P. Spertus, Chicago, IL (US); Charles Fiterman, Deerfield, IL (US); Jim Polubinski, Palos Hills, IL (US); Brian Day, Hillside, IL (US); Daryl Hoyt, Aurora, IL (US); Christopher D. Metcalf, Wellesley, MA (US)

(73) Assignee: Symantec Operating Corporation, Cupertino, CA (US)

( * ) Notice: Subject to any disclaimer, the term of this patent is extended or adjusted under 35 U.S.C. 154(b) by 570 days.

(21) Appl. No.: 10/920,597

(22) Filed: Aug. 17, 2004

(51) Int. Cl.
*G06F 11/28* (2006.01)
*G06F 12/14* (2006.01)

(52) U.S. Cl. .................. 714/52; 711/152; 711/173; 717/124; 717/131

(58) Field of Classification Search ............. 711/152, 711/173; 714/52, 54; 717/124, 131
See application file for complete search history.

(56) References Cited

U.S. PATENT DOCUMENTS

| | | | |
|---|---|---|---|
| 6,055,612 A | 4/2000 | Spertus et al. | |
| 6,434,575 B1 | 8/2002 | Berry et al. | |
| 6,584,478 B1 | 6/2003 | Spertus | |
| 6,647,547 B1 | 11/2003 | Kanamaru et al. | |
| 2004/0215913 A1* | 10/2004 | Fougeroux et al. | 711/170 |
| 2004/0221120 A1* | 11/2004 | Abrashkevich et al. | 711/173 |

* cited by examiner

*Primary Examiner*—R. Stephen Dildine
(74) *Attorney, Agent, or Firm*—Meyertons Hood Kivlin Kowert & Goetzel, P.C.; Rory D. Rankin

(57) ABSTRACT

A method and mechanism for managing dynamically allocated memory. Portions of memory which are available for allocation have additional information stored in association with each portion which indicates whether the portion has been previously identified as being prematurely freed. In addition, a checksum is stored with each portion of memory. In response to a request for deallocation of a portion of memory, the portion of memory is not deallocated if it is identified as having been prematurely freed. Otherwise, the a checksum is calculated for the portion and it is freed. In response to an allocation request, a candidate portion of memory is identified for allocation and a checksum is calculated for the candidate portion. If the calculated checksum does not match a checksum previously stored for the candidate portion, the portion is identified as having been prematurely freed and is not returned for allocation.

18 Claims, 5 Drawing Sheets

FIXING PREMATURELY FREED OBJECTS

IDENTIFICATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings: Copyright® 2003, Veritas Software Corporation, All Rights Reserved.

BACKGROUND OF THE INVENTION

1. Field of the Invention

The invention relates to computing systems and, more particularly, to detecting and fixing prematurely freed objects.

2. Description of the Related Art

Computer programming languages such a C and C++ allow programmers to manage memory by enabling them to explicitly allocate and free portions of memory during execution of a program. While this ability to explicitly allocate and free memory may simplify many programming tasks, it does present certain challenges as well. For example, once memory has been allocated, the programmer must ensure that it is not freed again until the program is done using it. Freeing a portion of memory before the program is done using it is sometime referred to as a "premature free". In addition, once the program is finished using allocated memory, it should be freed and not retained in an allocated state. Otherwise, the memory which was allocated will remain unavailable for reuse by that or other programs.

As those skilled in the art will appreciate, a variety of factors may increase the difficulty of avoiding errors in the management of memory. For example, the difficult in properly managing memory may increase as the size of a program grows. In addition, memory may be allocated in one module of a program, used in other modules of the program, and freed in still other modules. The fact that these modules may be written by different programmers can further complicate matters. Further, the difficulty in managing memory may also increase as a program ages. Most programs undergo revision in order to fix bugs or add new features. Given that the people who do the revisions may be different from those who wrote the original program, the manner in which the revised program manages memory may be different from that contemplated by the original authors of the program.

One way of solving some of the problems posed by programs which manage their own memory is to reserve all freeing of memory to a special program called a garbage collector which frees blocks of memory that are no longer being used by a program. Generally speaking, garbage collectors work by detecting portions of memory that no longer have pointers pointing to them (i.e., are "unreachable"). In this manner, the garbage collector may identify and help resolve memory leaks. However, while the use of automated garbage collectors may ease some of the problems of managing memory, garbage collection mechanisms—when they are available—may involve a significant amount of overhead. Consequently, it may not be desirable to use automated garbage collection for a particular application.

In addition to the above, garbage collectors generally do not address the problem of prematurely freed memory. As noted above, a premature free results when a portion of memory is freed while the portion of memory is still in use by the program. Once memory is free, it generally becomes part of the system heap and is made available for reallocation. A subsequent attempted access to memory that has already been freed may access data in an unrelated part of the program. Consequently, premature frees may result in corrupted data. In addition, locating the root cause of such data corruption can be very difficult to debug.

Accordingly, an effective method and mechanism for managing premature frees is desired.

SUMMARY OF THE INVENTION

A method and mechanism for manage memory usage are contemplated and, in particular, for detecting and fixing premature frees.

In one embodiment, a memory allocator/deallocator is modified to support the detection and management of premature frees in dynamically allocated memory. Contemplated is a method and mechanism in which portions or blocks of heap memory which are available for allocation have additional information stored in association with each portion which indicates whether the portion has been previously identified as having been prematurely freed. Also stored in association with each portion of memory is a checksum for the data in the allocated portion memory. In response to a request for deallocation of a particular portion of memory, the portion of memory will not be deallocated if it is identified as having been prematurely freed. If the portion to be deallocated is not identified as having been prematurely freed, a checksum is calculated for the portion and it is freed. In response to a request for the allocation of a portion of memory, a candidate portion of memory is identified for allocation and a checksum is calculated for the candidate portion. If the calculated checksum does not match the checksum which was previously stored for the candidate portion, then the portion is identified as having been prematurely freed, an indication that the portion corresponds to a prematurely freed portion is stored, and the portion is not returned for allocation.

Also contemplated is an embodiment in which a list is maintained which identifies portions of code in an application as having been deemed unsafe. In one embodiment, when it is determined that a candidate portion of memory was prematurely freed, an identification of the calling/requesting code is stored in association with the candidate portion and the identification is added to an "unsafe list". In one embodiment, identification of the calling/requesting code is in the form of the program counter corresponding to the requesting code. In response to a request for deallocation of a portion of memory, a check is performed to determine if the requestor of the deallocation is included on the unsafe list. If the requestor is identified as being included in the unsafe list, the portion of memory is not deallocated.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
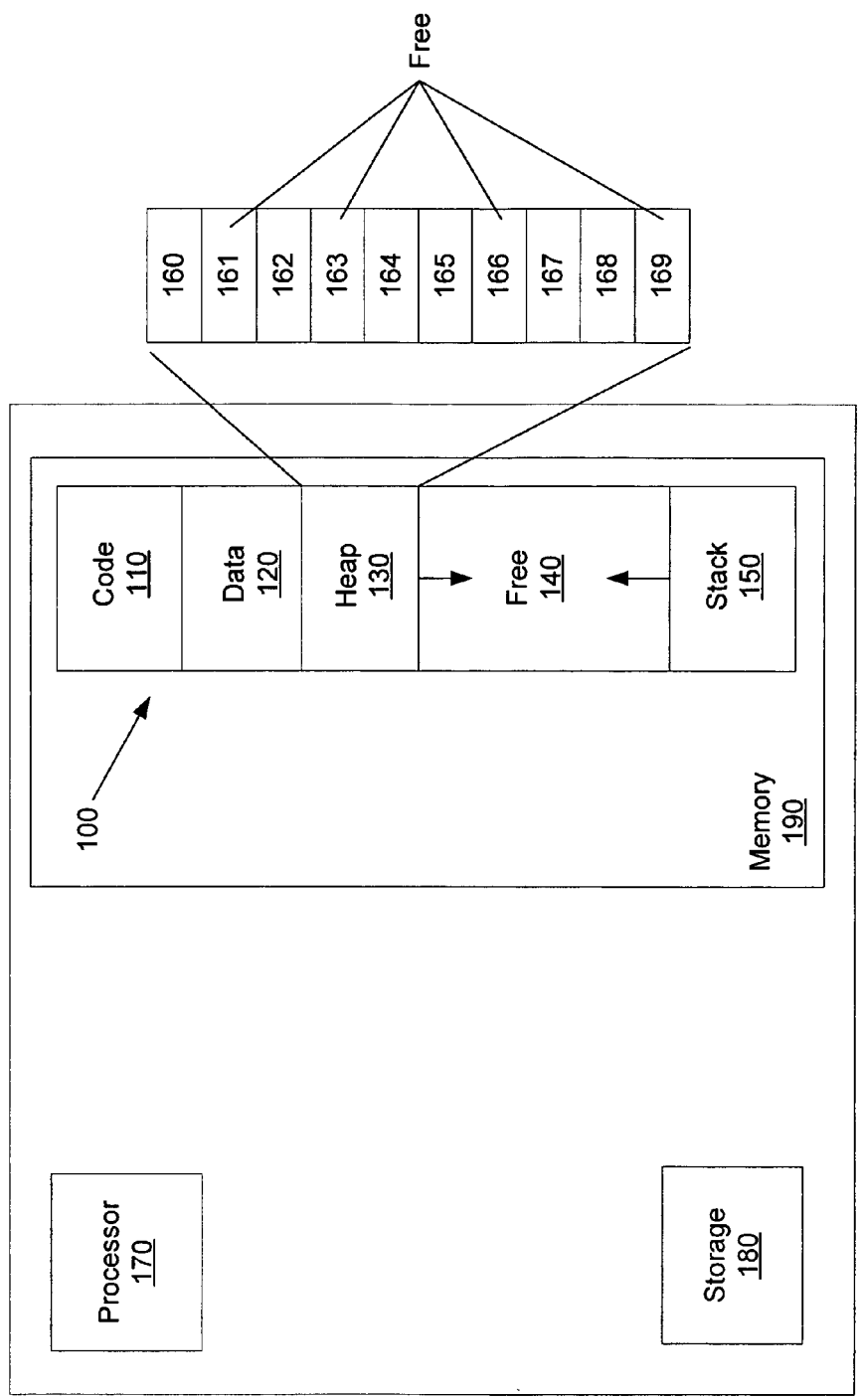
FIG. 1 depicts one embodiment of a computing system.

FIG. 1 illustrates one embodiment of a computing system and illustrates one embodiment of the logical layout of memory in the system. In the example shown, the system includes a processing device 170, memory system 190, and persistent storage 180. Generally speaking, the memory system 190 may include one or more caches and a system memory. Storage 180 may generally comprise a disk based system, but any suitable form of persistent storage may be utilized. Also illustrated, is a logical layout 100 of memory in the system. As shown, the memory may be divided into multiple regions, each of which is designated for a particular purpose. Included among the regions, or partitions, is a code section 110, a data section 120, a heap section 130, a free section 140, and a stack section 150. Generally speaking, the code section 110 is used for storing executable application code and the data section 120 is used for storing application data. Stack section 150 may be used for temporarily storing data in response to procedure calls or other types of changes in context. Heap 130 is used for dynamically allocated memory during execution of a program. Finally, free section 140 represents memory which is available for use by both the heap 130 and the stack 150. In general, the heap 130 and stack 150 grow towards each other as each of these sections increase in size.

Unlike the stack 150, the heap 130 is generally not maintained in a strictly ordered manner. Consequently, a contiguous region of memory within the heap 130 may include disjoint areas which are in use or are free. For example, memory blocks 160-169 in FIG. 1 represent a contiguous area of memory within the heap 130. However, as noted in the example, only blocks 161, 163, 166 and 169 are free. Accordingly, blocks 160, 162, 164, 165, 167, and 168 are currently in use (i.e., have been allocated for use by the program). Because free areas of memory within the heap 130 are generally not maintained in a contiguous manner, locating a suitable area of free memory in response to an allocation request may be relatively inefficient. Consequently, various techniques are used to facilitate a more rapid and orderly identification of free blocks of memory for allocation. For example, a free list may be maintained in which blocks of memory which are free form a linked list. Some embodiments may utilize tables of free lists where each free lists corresponds to a particular size of allocated block(s). In addition, various algorithms may be used for selecting which block(s) are to be allocated in response to a request. In some embodiments, the first available free block(s) is returned. Other embodiments may search for the best fit. Numerous such alternatives are possible and are contemplated. As used herein, "block" or "blocks" of memory may refer to any allocable region of memory. For example, blocks may be measured and allocated in terms of bytes or words. An allocated region of memory may be referred to as a collection of blocks. Alternatively, the entire allocated region of memory may simply be referred to as a block. In addition, various embodiments may utilize blocks which are variable in size.

Figure 2:
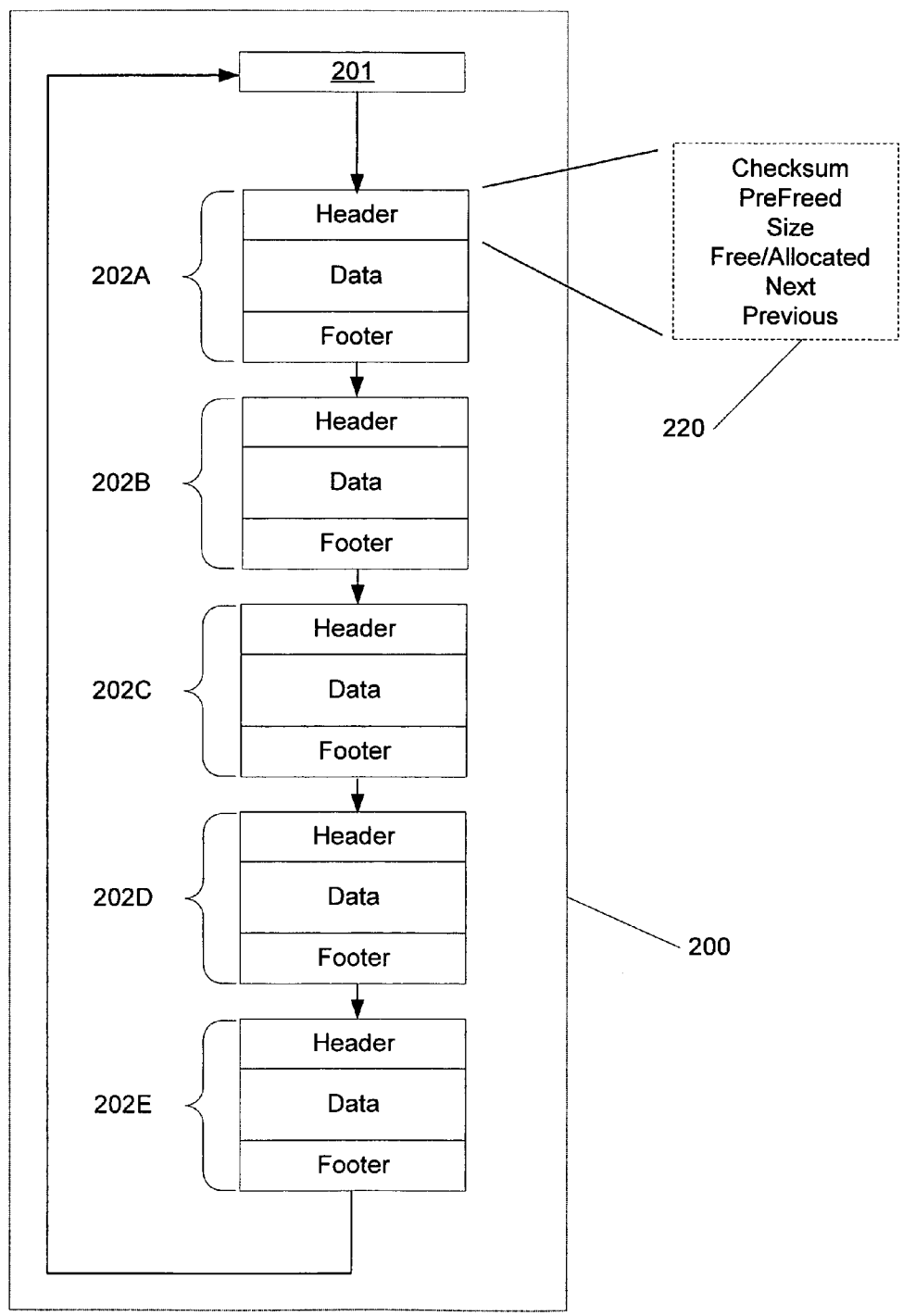
FIG. 2 depicts one embodiment of a free list.

FIG. 2 illustrates one embodiment of a list 200 for use in identifying those portions of the heap which are in use and those which are free. In the example shown, list 200 includes multiple blocks (201A, 202B, 202C, 202D, and 202E) of memory. A head pointer 201 is included which points to the first block 202 in the list. Each block in the example shown, includes a header section, data section, and a footer section. The header and footer sections of a block generally include information about the block, such as its size and whether or not it is currently free. The data section of the block is used for storing the actual data of the program. It is to be understood that the list described in FIG. 2 is only one of many ways such lists may be configured and maintained. Those skilled in the art will appreciate numerous other ways such lists may be implemented. For example, in one embodiment, block metadata (i.e., header and/or footer data) may be maintained separately from the actual data to which it corresponds. In this manner, the metadata may be protected from overwrites or other forms of corruption during program execution. Elements referred to herein with a particular reference number followed by a letter may be collectively referred to by the reference number alone. For example, blocks 202A-202E may be collectively referred to as blocks 202.

In one embodiment, each block 202 of memory includes pointers for use in forming a linked list. Such pointers may be maintained in either the header, footer, or both. For example, in one embodiment, free blocks of memory are configured as a linked list so as to facilitate rapid traversal of blocks of memory which are available for allocation. This list of free blocks may generally be referred to as a "free list". When a particular block of memory is allocated for use, it is "removed" from the free list by modifying the appropriate pointer to bypass the allocated block. Similarly, when a block of memory is freed, it is inserted into the free list by modifying the appropriate pointers to include the freed block in the list.

As discussed above, a variety of problems may arise in an application where memory is explicitly managed by the programmer(s) who write the application. One such problem that was mentioned in the that of premature frees. With respect to the discussion of the free list above, a premature free may generally refer to a situation where a program modifies a block of memory which is currently identified as being free (e.g., it is currently in the free list). As the free list is configured to maintain references to memory which are not currently in use or needed by the program, such a situation clearly denotes a problem. In order better manage the problem of premature frees, a method and mechanism described as follows may be used.

In one embodiment, additional information is maintained for each block of memory within the heap. In the example of FIG. 2, each of the headers of the depicted blocks may include information such as that illustrated by block 220. In one embodiment, a checksum (or any other suitable signature, such as CRC, Hamming code, MD5, etc.) for the block is maintained. The checksum may generally correspond to only the data stored within the data section, though other embodiments may also include the block metadata or other information as well. In addition, a "PreFreed" indication is maintained which indicates whether or not the block has previously been identified as being prematurely freed. Also illustrated is a "Size" indication which indicate the size of the block and a "Free/Allocated" indicator which indicates whether the block is currently free or in use. Not shown are the above described list pointers which may also be included in the header, along with any other information deemed suitable. It is noted that the information depicted by block 220 may be maintained in either the header, footer, or both.

Figure 3:
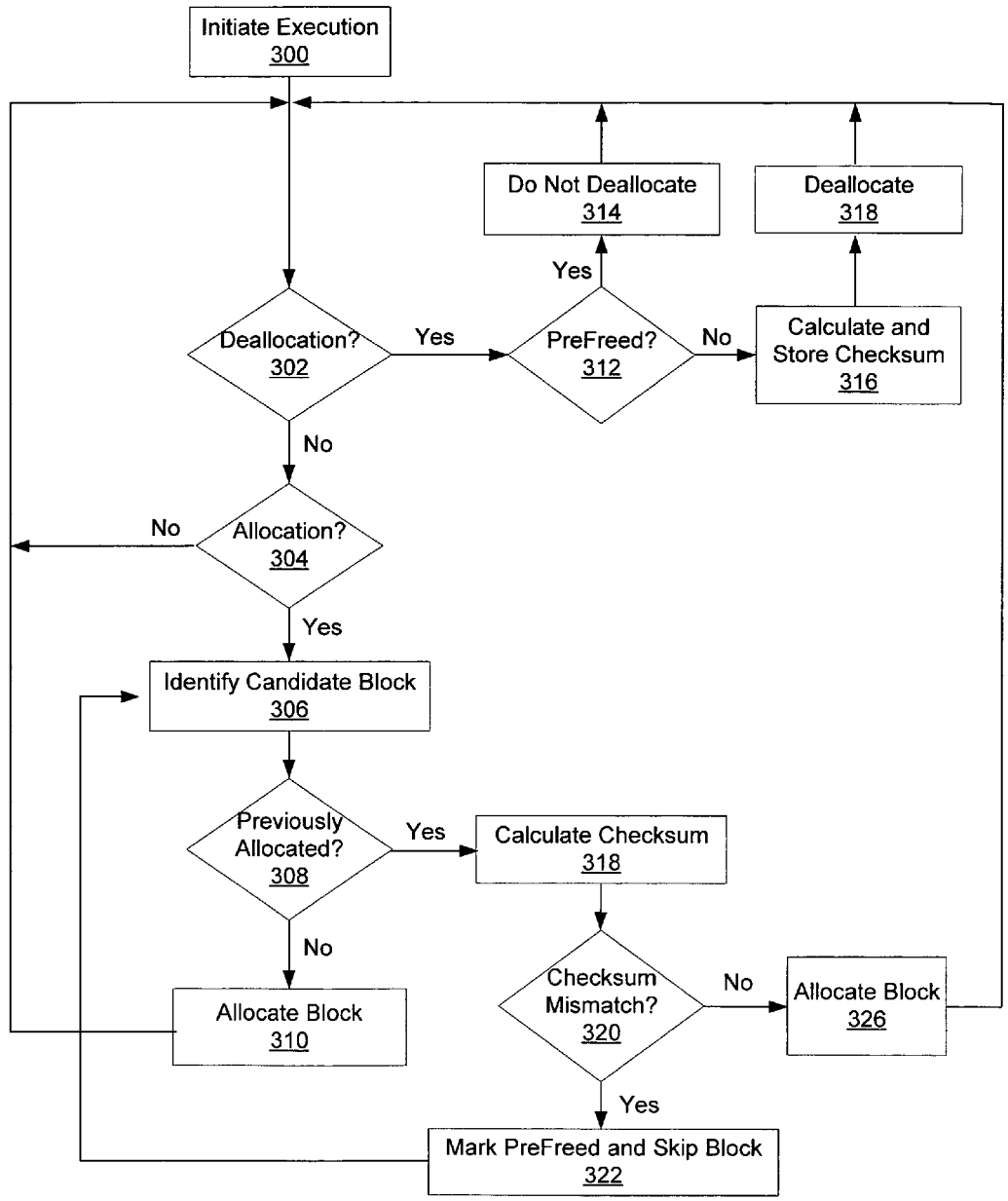
FIG. 3 depicts one embodiment of a method for managing prematurely freed memory.
Figure 4:
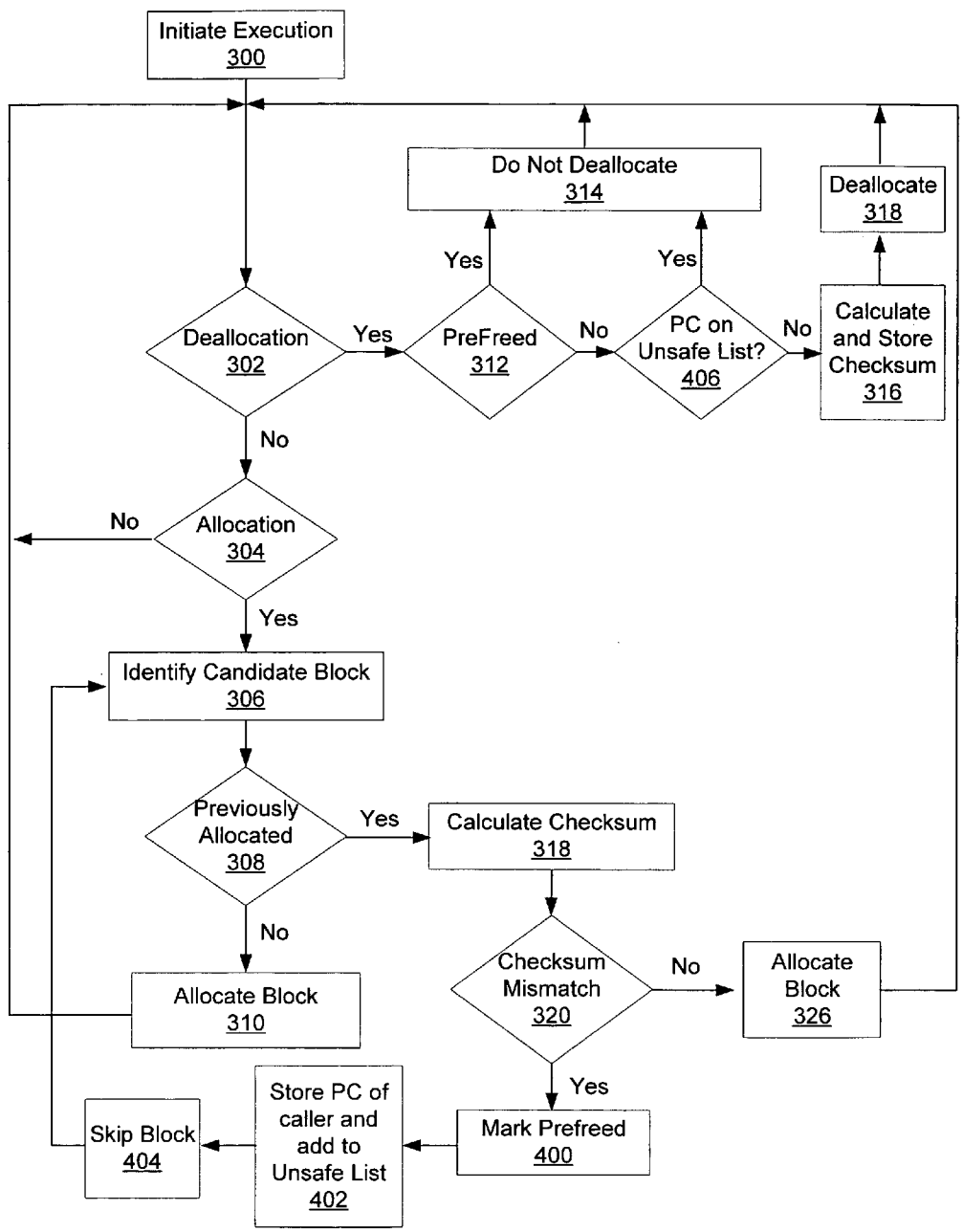
FIG. 4 depicts an alternative embodiment of a method for managing prematurely freed memory.

Turning now to FIG. 3, one embodiment of a method for managing dynamically allocated memory is shown. In one embodiment, the operations which are used by a particular program for allocating and deallocating memory are modified. For example, in a C programming language based implementation, the malloc and free operations are modified. In a C++ based implementation, the new and delete operations are modified. Modification of these operators may be accomplished via injection, relinking with a new allocation library, or otherwise. Subsequent to modification, the general operation of the allocation and deallocation of memory may be as represented by FIG. 3 or FIG. 4.

In FIG. 3, execution of a particular program is initiated (block 300). Subsequent to execution, memory allocations/deallocations may be detected. If a deallocation is detected (decision block 302), such as in response to a free or delete operation, the method determines whether the block being freed has previously been identified as being PreFreed (prematurely freed) (decision block 312). For example, as described above, the header of the block may be configured to store a PreFreed indicator. If the block is not identified as one which has previously been prematurely freed, a checksum (or other signature) is calculated for the block and stored in the block (block 316), and the block is deallocated (block 318). On the other hand, if the block is identified as having been prematurely freed on a prior occasion (decision block 312), the block is not deallocated (block 314). Consequently, blocks which have been identified as being prematurely freed are not returned to the free list. In this manner, the block cannot again be prematurely freed.

In the event an allocation is detected (decision block 304), the allocator identifies a candidate block for allocation (block 306). Identification of the candidate block may be pursuant to any suitable algorithm, such as first fit, best fit, or otherwise. Subsequent to identifying a candidate block, the allocator may determine whether the identified block has previously been allocated (decision block 308). For example, in the early stages of execution, much of the heap has not yet been allocated a first time. In one embodiment, a flag in the header may be used to indicate whether the block has previously been allocated. If the block has not been previously allocated, the block is allocated (block 310) and the flow returns to block 302 as indicated.

In the event that it is determined the candidate block has been previously allocated (decision block 308), the block was previously utilized and freed by the program. As noted in the deallocation sequence of FIG. 3, blocks which are freed have a checksum calculated and stored prior to the deallocation. Therefore, the identified candidate block should not only be unmodified since being previously deallocated, but should also have the previously calculated checksum stored in its header (or if not stored in the header, stored in whatever manner the metadata for the block is being maintained). Therefore, in order to confirm the candidate block has not been modified since being freed, a checksum is again calculated for the block (block 318), and compared to the checksum which was previously stored for the block (decision block 320). If the checksums match, indicating the block has not been modified since being freed, the candidate block is allocated (block 326). However, if the checksums do not match, then the block has been modified since being freed and a premature free has apparently occurred. Therefore, the block is marked as having been prematurely freed (e.g., by setting the PreFreed indicator) and the candidate block is not allocated (block 322). Instead, the block is skipped and flow returns to block 306 in order to seek a new candidate block for allocation.

In the embodiment of FIG. 3, both allocations and deallocations are modified to support management of prematurely freed memory. In the case of deallocations, blocks which are identified as having been prematurely freed are not deallocated and returned to the free list. Blocks to be deallocated which are not identified as having been prematurely freed have their checksum calculated and stored prior to deallocation. In the case of memory block allocations, those which are identified as having been modified after being freed are identified as having been prematurely freed. These blocks are not returned to the caller/requestor as an allocated block. Rather, these blocks are marked as having been prematurely freed and are essentially skipped by the allocator when it comes time to allocate a block. It is noted that during the search for a candidate block (block 306), those blocks which already include an indication that they were prematurely freed on a prior occasion are not considered viable candidates for allocation and are skipped.

FIG. 4 illustrates an alternative embodiment for managing dynamically allocated memory. In the embodiment of FIG. 4, information similar to that as described in block 220 of FIG. 2 may be maintained. However, in addition that information, the embodiment of FIG. 4 is also configured to maintain an identification of the "caller" or "requestor" memory allocations. For example, in one embodiment, a caller of a memory allocation (e.g., the instruction(s) corresponding to a malloc or a new operation) is identified by the Program Counter (PC) corresponding to the calling instruction. Generally speaking, once program code image is loaded into memory, the PC for a given instruction remains constant throughout execution. Therefore, each time a particular instruction is executed, as identified by its PC, it may be assumed it is the same instruction being executed each time.

In the embodiment of FIG. 4, an "unsafe list" is maintained which keeps track of "callers" which have been deemed unsafe. FIG. 4 is similar to FIG. 3, with the exception of blocks 402, 404, and 406. With respect to allocations, if an identified candidate block has a checksum mismatch (decision block 320), the block is marked as having been prematurely freed (block 400)—which is similar to that of block 322 in FIG. 3. However, in this case, the PC of the caller is also stored with the metadata of the block (e.g., in the header) and the PC is added to a list of caller PCs which are considered unsafe (block 402). These caller PCs are deemed unsafe in the sense that they correspond to callers which are associated with premature frees. Finally, the block is skipped (block 404) as before, and the search for a block continues (block 306).

In the case of deallocations, if a block being deallocated is identified as being prematurely freed (block 312), it is not deallocated (block 314) as was the case in FIG. 3. However, if the block is not identified as having prematurely freed (block 312), a further check is performed to determine if the block includes the identification of a caller PC which is included in the unsafe caller list (block 406). If the block caller is included in the unsafe caller list, the block is not deallocated (block 314). In this manner, a block associated with a caller which has been identified as being associated with unsafe practices in the past (e.g., premature frees) will not be freed. This block is not freed even if it has not itself been identified as having been prematurely freed in the past. In this manner, an added measure of protection is provided against a portion of program code which has behaved incorrectly in the past and has the potential to further corrupt or crash the program.

It is noted that in FIG. 4 an unsafe PC is stored for a block if the block has already been identified as corresponding to a premature free (block 402). In such a case a deallocation check as occurs in decision block 406 may simply identify whether the block stores a valid PC. For example, blocks may be initialized with metadata which includes a null PC caller value. If the PC value is null, the deallocator does not perform a check against the unsafe caller list. In an alternative embodiment, all blocks which are allocated may have the caller PC stored (e.g., at block 326). In such a case, the deallocator could be configured to compare all block caller IDs against the unsafe caller list. Numerous such alternatives are possible and are contemplated.

Implementation and maintenance of the unsafe caller list may take many forms. For example, in one embodiment, a multilevel table, similar to that used for page tables, may be utilized for the unsafe caller list. In such an embodiment, a portion of the bits of the PC may be used for indexing to various levels of the table. For example, the most significant bits of the PC may index to a first level of the table, a second most significant 10 bits of the PC may index to a second level of the table, and so on. Such an embodiment may provide for a constant time indexing which may be desirable in a particular implementation.

In addition to the above, various embodiments may be configured to store the unsafe list for a particular application in persistent storage. In such an embodiment, the list may be stored along with an identification of both the corresponding application and the version of the application at that time. When the application is reexecuted, the list is retrieved. If the current version of the application matches that which was stored with the unsafe list, the stored unsafe list may be utilized immediately instead of being reconstructed during execution. On the other hand, if the current version of the application does not match that which was stored with the unsafe list, the stored unsafe list is not used.

Figure 5:
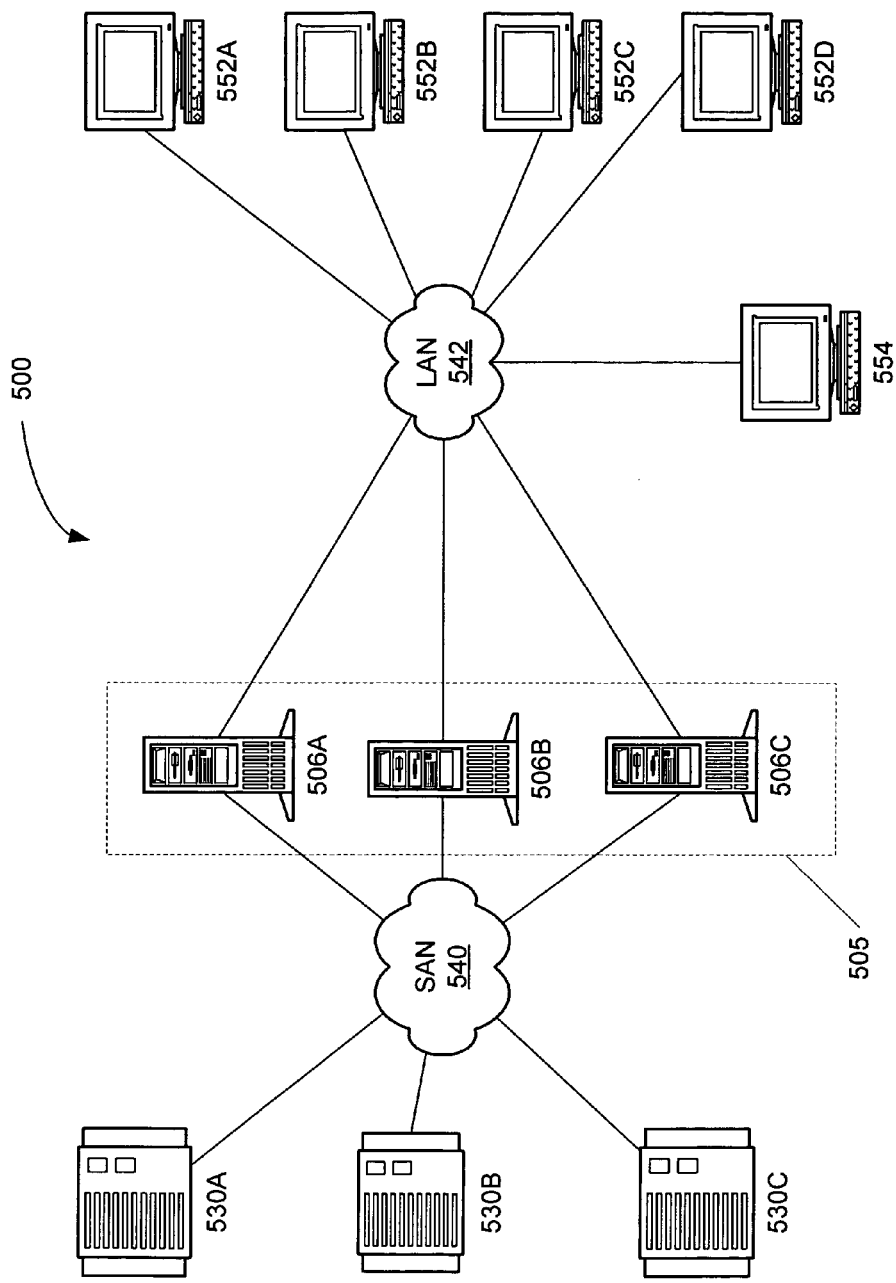
FIG. 5 illustrates one embodiment of a computing system configured to monitor memory usage.

Turning now to FIG. 5, one embodiment of a computing system which incorporates the above described methods and mechanisms is illustrated. FIG. 5 shows one embodiment of a computing cluster, SAN, and LAN in a computer network 500. In the example shown, servers 506A-506C form a cluster 505. Together with data storage devices 530A-530C and SAN interconnect 540, servers 506 form a SAN. Servers 506 have direct access to any of the storage devices 530 which are connected to the SAN interconnect 540. SAN interconnect 540 is typically a high speed interconnect, such as Fibre Channel. As already noted, the servers and storage devices comprise a network in and of themselves. In the SAN, no server is dedicated to a particular storage device as in a LAN. Any server 506 may access any storage device 530 on the storage area network. Representative characteristics of a SAN may include a 200 MB/sec bandwidth, up to 526 nodes per loop, a connection distance of 50 kilometers, and a storage capacity of 9572 gigabytes. Consequently, the performance, flexibility, and scalability of a SAN may be significantly greater than that of a typical SCSI based system.

Also included in the network 500 of FIG. 5 are workstations 552 and LAN interconnect 542. As shown in FIG. 5, LAN 542 is coupled to cluster 505. Because each storage device 530 may be independently and directly accessed by any server 506, overall data throughput between the LAN and SAN may be much greater than that of the traditional client-server LAN. For example, if workstations 552A and 552C both submit access requests to storage 530, two of servers 506 may service these requests concurrently. Alternatively, one of servers 506 may be configured as a failover server. In the event one of the servers 506 fails, another may become active in order to prevent service interruption or downtime.

In addition to workstations 552, FIG. 5 also depicts an administrator workstation 554 which may be used by a system administrator to configure and monitor operation of various hardware and software components in the network 500. In one embodiment, as discussed above, workstation 554 is configured to monitor memory usage of applications executing on each of workstations 552, cluster 505, and elsewhere within the system 500. As already noted, numerous such network configurations are possible and are contemplated.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

APPENDIX A

The following listing depicts selected code fragments corresponding to one embodiment of an allocation and deallocation method and mechanism. The listing is not intended to be comprehensive or limiting in any way. Rather, the following listing is only intended to depict one possible embodiment.

Header Format

```
struct GCRobustInfo {
  union {
    // When object is free,__next points to the next object in the free list
    ptr_t __next;
    // When the object is allocated it stores the user-requested length of
    the object unsigned long __userLength;
  };
  // Store the flags and the pc together. This may reduce the accuracy of
  the pc, but
  // should be sufficient to identify the corresponding module.
  unsigned long  __flags_and_pc;
  // When the object is free, __checksum has the checksum of the object
  unsigned long  __checksum;
  char * getPC( );
};
enum {
  FlagObjectAllocated = 0x1,
```

-continued

```
    FlagAlreadyReportedLeak = 0x2,
    FlagAlreadyReportedSmash = 0x4,
    FlagChecksumAvailable = 0x8,
    FlagPrematureFree = 0x10,
    AllFlags = 0x1F
};
```

| Fragments of Code for Allocation |
|---|

```
// This is the malloc entry point
GS_C_API_REPLACEMENT(void *)
INTERCEPT_NAME(malloc)(size_t lb)
{
    gsAllocState state;
    state.pc = GETPC( );
    state.debugHeader = NULL;
    return gcMemFunctions.mallocFunction(lb, &state);
}
// mallocFunction( ) will point to an instance of the GC_MALLOC_
FUNCTION_NAME macro.
void *
GC_MALLOC_FUNCTION_NAME(MALLOC_PARAMETERS)
{
    register ptr_t op;
    extern_ptr_t _temp;
    register gsFreelistHead * opp;
    register word lw = 0;
    register unsigned list;
    gcHeap *heap;
    gcDiscriminatedLock *heapLock;
    ...
    if(lb <= gcMaxSmallObject) {
        GET_WORDS_AND_LIST;
        heap = GET_HEAP_T( );
        if(!heap) {heap = &gcDefaultHeap;}
        GET_HEAP_LOCK_S(heapLock, heap);
        opp = heap->BYTES_TO_OBJ_FREELIST[lb];
        LOCK_S(*heapLock);
        POP_LIST_HEAD(op, opp, lw, state);
        if( op == 0 || CHECK_ALLOCATED(op)) {
            UNLOCK_S(*heapLock);
            temp = op;
// This do/while loop will skip blocks in the free list until we find
one that was not
// prematurely freed.
// CHECK_ALLOCATED(temp) will return TRUE if the block was
prematurely freed
            do {
                if(temp) {
                    REPORT_ALLOCATED(temp);
                }
                temp = GEN_MALLOC((word)lb, heap, GC_
                OBJECT_TYPE);
            } while (temp && CHECK_ALLOCATED(temp));
            if (temp) {
                ...
                ALLOCATION_SUCCESS_ACTION;
            } else {
                ALLOCATION_FAILED_ACTION;
            }
            return temp;
        }
...
// The macro CHECK_ALLOCATED( ) is a macro that calls
gsCheckAllocatedRobust ( ).
// The function gsCheckAllocatedRobust returns TRUE if the object
was prematurely freed.
#define CHECK_ALLOCATED_robust(op)
(gsInternalGetBooleanFeature(gsUseAfterFreeDetection) &&
gsCheckAllocatedRobust((ptr_t) op, lw, state))
// gsComputeCheckSum( ) is the function that computes the checksum.
inline unsigned long
gsComputeCheckSum( ptr_t p, GCRobustInfo *debugInfo, word lw)
{
...
    // utilize suitable algorithm to generate a checksum/signature
    ...
    return checksum;
}
// gsCheckAllocatedRobust( )is the function called by the macro
```

-continued

```
// CHECK_ALLOCATED_robust( ).
word
gsCheckAllocatedRobust( ptr_t p, word lw, gsAllocState * state)
{
    // Try first with previously saved value
    GCRobustInfo * debugInfo = (GCRobustInfo *) state->debugHeader;
    if( debugInfo == NULL ) {
        debugInfo = gsGetDebugInfo( p );
    }
    if( debugInfo == NULL ) {
        // Object is not heap object or object is not currently allocated
        return 0;
    }
    if ( gsInternalGetBooleanFeature(gsUseAfterFreeDetection)) {
        if ( gcRobustCheckChecksum( p, debugInfo, lw )) {
            return 1;
        }
    }
    return 0;
}
// gcRobustCheckChecksum compares the checksum stored in the header
with the
// computed checksum.
inline gcBool
gcRobustCheckChecksum(ptr_t p, GCRobustInfo * debugInfo, word lw )
{
    if ( debugInfo->_flags_and_pc & FlagChecksumAvailable) {
        // For large objects, the lw parameter is zero. Find the
        // size directly from the hhdr.
        if(!lw) {
            hdr* hhdr = gcFindHeader(p);
            if (hhdr)
                lw = hhdr->hb_objsz;
        }
        // Check the checksum
        unsigned long checksum = gsComputeCheckSum( p, debugInfo, lw);
        if ( debugInfo->_checksum != checksum ) {
            // Object has been used since it was freed.
            // Mark object as allocated again.
            // Do not report smashing on this object
            debugInfo->_flags_and_pc |= (FlagObjectAllocated |
FlagAlreadyReportedSmash);
            return 1;
        }
    }
    return 0;
}
```

| Free call |
|---|

```
// This is the entry point for free( )
GS_C_API_REPLACEMENT(void)
INTERCEPT_NAME(free)(void *p)
{
    gsAllocState state;
    state.pc = GETPC( );
    state.debugHeader = NULL;
    gcMemFunctions.freeFunction(p, &state);
}
// freeFunction( ) calls an instance of the following macro
GC_FREE_FUNCTION_NAME( )
void HB_FREE_ATTR
GC_FREE_FUNCTION_NAME(void *p, hdr *hhdr, gsAllocState
* state)
{
    ...
    if (MAY_FREE((ptr_t) p, lw, state)) {
        if(!FREEING_IS_DISABLED) {
            flh = hhdr->hb_objfreelist;
            DEFER_FREE(p, lw, state, flh, heap, heapLock);
            PROCESS_FREE(p, lw, state, flh, heap, heapLock);
        }
        // Here we compute the checksum of the free object
        AFTER_FREE(p, lw, state);
    }
}
// macro AFTER_FREE_robust is called in robust mode to compute
the checksum of the object after it has been freed and stores the
checksum value in the header.
```

-continued

```
# define AFTER_FREE_robust(p, lw, state) gcRobustAfterFree((ptr_t)
p, lw, state)
void
gcRobustAfterFree( ptr_t p, word lw, gsAllocState * state)
{
   GCRobustInfo * debugInfo = (GCRobustInfo *) state->debugHeader;
   if ( debugInfo == NULL) { debugInfo = (GCRobustInfo *)
gsGetDebugInfo( p ); }
   if ( debugInfo == NULL) { return; }
   // Store pc and clear flags
   debugInfo->_flags_and_pc = ((unsigned long) state->pc &
~AllFlags);
   if ( gsInternalGetBooleanFeature(gsUseAfterFreeDetection)) {
      // Compute checksum and make it available
      debugInfo->_checksum = gsComputeCheckSum( p, debugInfo, lw);
      debugInfo->_flags_and_pc |= FlagChecksumAvailable;
   }
}
```

What is claimed is:

1. A method for managing memory, said method comprising:

detecting a request to free a first block of memory;

freeing said first block of memory, in response to detecting said request and determining said first block of memory does not correspond to a prematurely freed block of memory; and not freeing said first block of memory, in response to detecting said request and determining said first block of memory corresponds to a prematurely freed block of memory;

in response to identifying the first block corresponds to a prematurely freed block of memory:

storing an indication that the candidate block corresponds to a prematurely freed block of memory;

skipping said first block for purposes of allocation; and searching for a new block for allocation.

2. The method as recited in claim 1, wherein in response to determining said block of memory does not correspond to a prematurely freed block of memory, the method further comprises:

calculating a checksum corresponding to said block; and storing said checksum in association with said block.

3. The method as recited in claim 2, further comprising:

detecting a request for an allocation of a block of memory;

identifying a candidate block of memory for allocation;

calculating a checksum of said candidate block and comparing the calculated checksum to a previously stored checksum which is associated with the candidate block;

allocating the candidate block, in response to detecting the calculated checksum matches the previously stored checksum; and identifying the candidate block as corresponding to a prematurely freed block of memory, in response to detecting the calculated checksum does not match the stored checksum.

4. The method as recited in claim 1, further comprising maintaining a list which identifies requesters of memory allocation which are deemed unsafe.

5. The method as recited in claim 4, wherein the list identifies the requesters by a program counter corresponding the requester instruction in the program code.

6. The method as recited in claim 5, wherein freeing said first block of memory is in further response to determining the first block of memory does not correspond to a requestor which is included in the list.

7. The method as recited in claim 6, wherein in response to detecting the request for an allocation of a block of memory and identifying the candidate block as corresponding to a prematurely freed block of memory, the method further comprises storing an identification of the requester in association with the candidate block and adding the identification to the list.

8. A computing system comprising:

a memory configured to store data; and a processing device configured to:

detect a request to free a first block of memory;

determine whether said first block of memory corresponds to a prematurely freed block of memory;

free said first block of memory, in response to detecting said request and determining said first block of memory does not correspond to a prematurely freed block of memory; and not free said first block of memory, in response to detecting said request and determining said first block of memory corresponds to a prematurely freed block of memory;

in response to identifying the first block corresponds to a prematurely freed block of memory:

store an indication that the first block corresponds to a prematurely freed block of memory;

skip said first block for purposes of allocation; and search for a new block for allocation.

9. The computing system as recited in claim 8, wherein in response to determining said block of memory does not correspond to a prematurely freed block of memory, the processing device is further configured to:

calculate a checksum corresponding to said block; and store said checksum in association with said block.

10. The computing system as recited in claim 9, wherein the processing device is further configured to:

detect a request for an allocation of a block of memory;

identify a candidate block of memory for allocation;

calculate a checksum of said candidate block and comparing the calculated checksum to a previously stored checksum which is associated with the candidate block;

allocate the candidate block, in response to detecting the calculated checksum matches the previously stored checksum; and identify the candidate block as corresponding to a prematurely freed block of memory, in response to detecting the calculated checksum does not match the stored checksum.

11. The computing system as recited in claim 8, wherein the processing device is further configured to maintain a list which identifies requestors of memory allocation which are deemed unsafe.

12. The computing system as recited in claim 11, wherein the list identifies the requesters by a program counter corresponding the requestor instruction in the program code.

13. The computing system as recited in claim 12, wherein freeing said first block of memory is in further response to determining the first block of memory does not correspond to a requester which is included in the list.

14. The computing system as recited in claim 13, wherein in response to detecting the request for an allocation of a block of memory and identifying the candidate block as corresponding to a prematurely freed block of memory, the processing device is further configured to store an identification of the requester in association with the candidate block and add the identification to the list.

15. A computer storage medium comprising program instructions for use in monitoring memory usage in an application, wherein the program instructions are computer-executable to:

detect a request to free a first block of memory;

free said first block of memory, in response to detecting said request and determining said first block of memory does not correspond to a prematurely freed block of memory; and not free said first block of memory, in response to detecting said request and determining said first block of memory corresponds to a prematurely freed block of memory;

in response to identifying the candidate block corresponds to a prematurely freed block of memory, the program instructions are further executable to:

store an indication that the candidate block corresponds to a prematurely freed block of memory;

skip said candidate block for purposes of allocation; and search for a new candidate block for allocation.

16. The computer storage medium as recited in claim 15, wherein in response to determining said block of memory does not correspond to a prematurely freed block of memory, the program instructions are further executable to:

calculate a checksum corresponding to said block; and store said checksum in association with said block.

17. The computer storage medium as recited in claim 16, wherein the program instructions are further executable to:

detect a request for an allocation of a block of memory;

identify a candidate block of memory for allocation;

calculate a checksum of said candidate block and comparing the calculated checksum to a previously stored checksum which is associated with the candidate block;

allocate the candidate block, in response to detecting the calculated checksum matches the previously stored checksum; and identify the candidate block as corresponding to a prematurely freed block of memory, in response to detecting the calculated checksum does not match the stored checksum.

18. The computer storage medium as recited in claim 15, the program instructions are further executable to maintain a list which identifies requesters of memory allocation which are deemed unsafe.

* * * * *

UNITED STATES PATENT AND TRADEMARK OFFICE
CERTIFICATE OF CORRECTION

PATENT NO. : 7,299,384 B1
APPLICATION NO. : 10/920597
DATED : November 20, 2007
INVENTOR(S) : Rodriguez-Rivera et al.

It is certified that error appears in the above-identified patent and that said Letters Patent is hereby corrected as shown below:

<u>Column 12,</u>

Lines 5, 55, 60, and 66, please delete "requester" and substitute --requestor--.

<u>Column 14,</u>

Line 22, please delete "requester" and substitute --requestor--.

Signed and Sealed this

Twenty-eighth Day of October, 2008

JON W. DUDAS
*Director of the United States Patent and Trademark Office*